(12) United States Patent
Lee et al.

(10) Patent No.: US 10,158,602 B2
(45) Date of Patent: Dec. 18, 2018

(54) METHOD AND APPARATUS FOR SETTING UP AN INTERNET PROTOCOL ADDRESS IN A WIRELESS COMMUNICATION SYSTEM

(71) Applicant: Samsung Electronics Co., Ltd., Gyeonggi-do (KR)

(72) Inventors: Jong-Hyo Lee, Gyeonggi-do (KR); Ji-Hye Lee, Seoul (KR); Se-Hee Han, Seoul (KR); Jae-Eun Kang, Gyeonggi-do (KR); Chil-Youl Yang, Seoul (KR); Myoung-Hwan Lee, Gyeonggi-do (KR); Chun-Ho Lee, Gyeonggi-do (KR); Tae-Young Lee, Seoul (KR)

(73) Assignee: Samsung Electronic Co., Ltd (KR)

( * ) Notice: Subject to any disclaimer, the term of this patent is extended or adjusted under 35 U.S.C. 154(b) by 204 days.

(21) Appl. No.: 14/096,766

(22) Filed: Dec. 4, 2013

(65) Prior Publication Data

US 2014/0153513 A1 Jun. 5, 2014

(30) Foreign Application Priority Data

Dec. 4, 2012 (KR) .................. 10-2012-0139932
Dec. 19, 2012 (KR) .................. 10-2012-0148996

(Continued)

(51) Int. Cl.
*H04L 29/12* (2006.01)
*H04W 12/06* (2009.01)
*H04W 8/26* (2009.01)

(52) U.S. Cl.
CPC ........ *H04L 61/2007* (2013.01); *H04L 61/203* (2013.01); *H04L 61/2015* (2013.01);

(Continued)

(58) Field of Classification Search
CPC ............... H04L 61/203; H04L 61/2007; H04L 61/2015; H04W 8/26; H04W 12/06
See application file for complete search history.

(56) References Cited

U.S. PATENT DOCUMENTS

| | | | | |
|---|---|---|---|---|
| 2005/0108431 | A1* | 5/2005 | Park ................. | H04L 29/12311 709/245 |
| 2006/0174018 | A1* | 8/2006 | Zhu ..................... | H04L 63/0435 709/228 |

(Continued)

FOREIGN PATENT DOCUMENTS

| | | |
|---|---|---|
| CN | 101243651 | 8/2008 |
| CN | 102572010 | 7/2012 |

(Continued)

OTHER PUBLICATIONS

Dapeng Liu, "Extend 802.1X for Higher Layer Configuration in FILS", IEEE 802.11-12/0547r1, XP068039017, May 11, 2012.

(Continued)

*Primary Examiner* — Anez C Ebrahim
(74) *Attorney, Agent, or Firm* — The Farrell Law Firm, P.C.

(57) ABSTRACT

A method and apparatus are provided for a client device to be allocated an Internet Protocol (IP) address by a Group Owner (GO) device, for direct communication between the client device and the GO device. The method includes transmitting, by the client device, an Association Request message to the GO device, receiving an Association Response message from the GO device, in response to the Association Request message, and receiving, by the client device, an IP address of the client device allocated by the GO device, during an authentication process between the client device and the GO device.

22 Claims, 6 Drawing Sheets

(30) Foreign Application Priority Data

Jan. 29, 2013 (KR) ........................ 10-2013-0010082
Feb. 12, 2013 (KR) ........................ 10-2013-0015066
Feb. 21, 2013 (KR) ........................ 10-2013-0018894

(52) U.S. Cl.
CPC ............. *H04W 8/26* (2013.01); *H04W 12/06* (2013.01); *H04L 61/2038* (2013.01)

(56) References Cited

U.S. PATENT DOCUMENTS

| | | | |
|---|---|---|---|
| 2007/0001853 A1 | 1/2007 | Otranen | |
| 2007/0002833 A1 | 1/2007 | Bajic | |
| 2008/0065884 A1* | 3/2008 | Emeott | H04L 9/0836 713/168 |
| 2010/0068997 A1 | 3/2010 | Dunko | |
| 2010/0095356 A1 | 4/2010 | Han et al. | |
| 2012/0290731 A1* | 11/2012 | Suumaki | H04L 61/2007 709/228 |

FOREIGN PATENT DOCUMENTS

| | | |
|---|---|---|
| WO | WO 2009/104131 | 8/2009 |
| WO | WO 2012/111999 | 8/2012 |

OTHER PUBLICATIONS

Hitoshi Morioka et al., "Higher Layer Configuration Function for TGai SFD", IEEE 802.11-12/0275r3, XP068038554, Mar. 14, 2012.

George Cherian et al., "Fast Authentication in TGai", IEEE 802.11-11/1160r9, XP068037231, May 14, 2012.

Ping Fang et al., "FILS Presentation on High Level Security Requirements", IEEE 802.11-12/278r0, XP01772481, Mar. 6, 2012.

IEEE Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, Amendment 6: Medium Access Control (MAC) Security Enhancements, IEEE Computer Society, XP017603687, Jul. 23, 2004.

Chinese Office Action dated Nov. 1, 2017 issued in counterpart application No. 201380069620.4, 17 pages.

\* cited by examiner

| Descriptor Type |  |
| --- | --- |
| 1 byte |  |
| Key Information | Key length |
| 2 bytes | 2 bytes |
| Replay Counter |  |
| 8 bytes |  |
| Key Nonce |  |
| 32 bytes |  |
| EAPOL-Key IV |  |
| 16 bytes |  |
| Key Receive Sequence Counter (RSC) |  |
| 8 bytes |  |
| Key Identifier |  |
| 1 byte |  |
| Key MIC |  |
| 16 bytes |  |
| Key Data Legth | Key Data |
| 2 bytes | 0 ... n bytes |

FIG.7

|  | Type (0xdd) | Length | OUI | Data Type | Data |
| --- | --- | --- | --- | --- | --- |
| Size(octet) | 1 | 1 | 3 | 1 | Length-4 |

FIG.8

|  | Client IP Address | Subnet Mask | Group Owner Address |
| --- | --- | --- | --- |
| Size(octet) | 4 | 4 | 4 |

FIG.9

METHOD AND APPARATUS FOR SETTING UP AN INTERNET PROTOCOL ADDRESS IN A WIRELESS COMMUNICATION SYSTEM

PRIORITY

This application claims priority under 35 U.S.C. § 119(a) to Korean Patent Application Serial Nos. 10-2012-0139932, 10-2012-0148996, 10-2013-0010082, 10-2013-0015066, and 10-2013-0018894, which were filed in the Korean Intellectual Property Office on Dec. 4, 2012, Dec. 19, 2012, Jan. 29, 2013, Feb. 12, 2013, and Feb. 21, 2013, respectively, the entire disclosure of each of which is hereby incorporated by reference.

BACKGROUND OF THE INVENTION

1. Field of the Invention

The present invention relates generally to a method and apparatus for setting up an Internet Protocol (IP) address in a wireless communication system.

2. Description of the Related Art

In a wireless communication system, the use of a high-speed data service is ever-increasing, and a device using the high-speed data service may perform communication by using an Internet Protocol (IP) address. However, a new scheme for setting up an IP address for a device is required.

SUMMARY OF THE INVENTION

The present invention has been made to at least partially solve, alleviate, or remove at least one of problems and/or disadvantages described above, and to provide the advantages described below.

Accordingly, an aspect of the present invention is to provide a method and apparatus for exchanging information for a main communication connection using Out-Of-Band (OOB) communication (for example, Near Field Communication (NFC)) and setting up an IP address according to a role of each device for a high-speed main communication connection in a wireless communication system.

Another aspect of the present invention is to provide a method and apparatus for setting up an IP address using NFC.

Another aspect of the present invention is to provide a method and apparatus in which an IP address is allocated in a procedure for exchanging an association request message and an association response message according to the Wi-Fi Direct standard in a wireless communication system.

In accordance with an aspect of the present invention, a method is provided for setting up an IP address between devices in a wireless communication system. The method includes transmitting, by a first device to a second device, an IP address pair proposed by the first device including a first IP address for the first device and a first IP address for the second counterpart device; receiving, by the first device from the second device, an IP pair proposed by the second device including a second IP address for the first device and a second IP address for the second device; determining one of the first device and the second device as a Group Owner (GO) device; determining the one of the first device and the second device not determined as the GO device as a client device; and determining a set IP address of the first device and a set IP address of the second device using the IP address pair proposed by the GO device.

In accordance with another aspect of the present invention, a method is provided for a client device to be allocated an IP address by a GO device, for direct communication between the client device and the GO device. The method includes transmitting, by the client device, an IP address allocation request to the GO device through an Association Request message; and receiving, by the client device, an IP address allocated to the client device by the GO device, through an Association Response message.

In accordance with another aspect of the present invention, a method is provided for a client device to be allocated an IP address by a GO device for direct communication between the client device and the GO device. The method includes transmitting, by the client device, an Association Request message to the GO device; receiving an Association Response message from the GO device, in response to the Association Request message; and receiving, by the client device, the IP address of the client device allocated by the GO device, during an authentication process between the client device and the GO device.

In accordance with another aspect of the present invention, a method is provided for allocating an IP address to a client device by a GO device for direct communication between the client device and the GO device. The method includes receiving, by the GO device, an Association Request message from the client device; transmitting an Association Response message to the client device, in response to the Association Request message; and transmitting, by the GO device, the IP address of the client device to the client device, during an authentication process between the GO device and the client device.

In accordance with another aspect of the present invention, a device is provided for setting up Internet Protocol (IP) addresses with another device in a wireless communication system. The device includes a transmitter configured to transmit, to the another device, an IP address pair proposed by the device including a first IP address for the device and a first IP address for the another; a receiver configured to receive an IP pair proposed by the another device including a second IP address for the device and a second IP address for the another device; and a controller configured to determine one of the device and the another device as a Group Owner (GO) device, determine the one of the device and the another device not determined as the GO device as a client device, and determine a set IP address of the device and a set IP address of the another device using the IP address pair proposed by the GO device.

In accordance with another aspect of the present invention, a device is provided to be allocated an IP address by a counterpart device for direct communication between the device and the counterpart device. The device includes a controller configured to determine the counterpart device and the device as a Group Owner (GO) device and a client device, respectively; a transmitter configured to transmit an IP address allocation request to the GO device through an Association Request message; and a receiver configured to receive the IP address of the client device allocated by the GO device through an Association Response message, in response to the Association Request message.

In accordance with another aspect of the present invention, a client device is provided to be allocated an IP address by a GO device for direct communication between the client device and the GO device. The client device includes a transmitter configured to transmit an Association Request message to the GO device; and a receiver configured to receive an Association Response message from the GO device, in response to the Association Request message, and to receive an IP address of the client device allocated by the GO device during an authentication process between the client device and the GO device.

In accordance with another aspect of the present invention, a GO device is provided for allocating an IP address to a client device for direct communication between the client device and the GO device. The GO device includes a receiver configured to receive an Association Request message from the client device; and a transmitter configured to transmit an Association Response message to the client device, in response to the Association Request message, and to transmit the IP address of the client device to the client device during an authentication process between the GO device and the client device.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 7 illustrates a format of an Extensible Authentication Protocol over Local Area Network (LAN) (EAPOL) Key message exchanged in a 4-way handshake step according to an embodiment of the present invention;

FIG. 8 illustrates a basic format for defining Key Data Encapsulation (KDE) per organization or company in a 4-way handshake step according to an embodiment of the present invention;

FIG. 9 illustrates an IP Address Allocation KDE inserted into a "Data" field according to an embodiment of the present invention;

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The terms and words used in the following description and claims are not limited to their dictionary meanings, but, are merely used to provide a clear and consistent understanding of the present invention. Accordingly, it should be apparent to those skilled in the art that the following description of the embodiments of the present invention is provided for illustration purpose only and not for the purpose of limiting the invention as defined by the appended claims and their equivalents.

In accordance with an embodiment of the present invention, a method is provided, which exchanges information for a communication connection using OOB communication (e.g., NFC) for a high-speed main communication connection (In-Band), and sets up an IP address for a network service according to a role of each device, thereby proving prompt network service to a user. Herein, the role of the device is a Group Owner (GO) or a client, i.e., the role in which the device is to operate.

In accordance with another embodiment of the present invention, a method is provided, which delivers role decision information and IP setup information proposed by each of two devices to the counterpart device through OOB message exchange and selects an IP address according to a role determined from the exchanged information.

In accordance with another embodiment of the present invention, a method is provided for a GO device to perform an IP setup operation in place of a Dynamic Host Configuration Protocol (DHCP) server, wherein each device transmits role decision information and an IP address through an OOB message.

Figure 1:
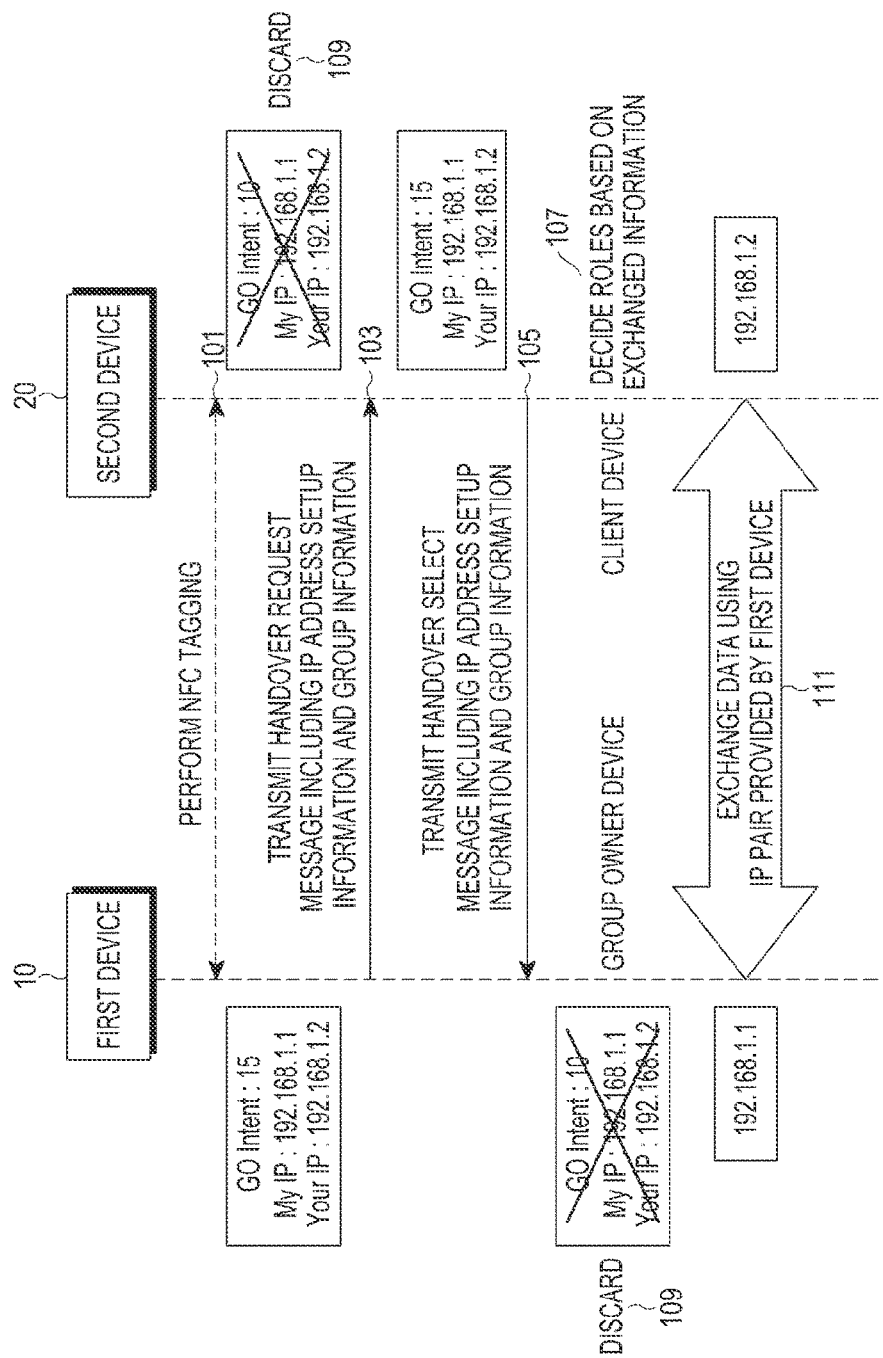
FIG. 1 is a signal flow diagram illustrating a method for setting up an IP address in an NFC system according to an embodiment of the present invention.

FIG. 1 is a signal flow diagram illustrating a method for setting up an IP address in an NFC system according to an embodiment of the present invention.

Referring to FIG. 1, a first device 10 and a second device 20 perform NFC tagging in step 101. In step 103, the first device 10 transmits, to the second device 20, an OOB message including role decision information, e.g., a GO intent value in Wi-Fi Direct, an IP address proposed by the first device 10, and an IP address usable by the second device 20.

In step 105, the second device 20 transmits, to the first device 10, an OOB message including role decision information, e.g., a GO intent value in Wi-Fi Direct, an IP address proposed by the second device 20, and an IP address usable by the first device 10.

Herein, the two IP addresses proposed by the first device 10 and the two IP addresses proposed by the second device 20 are defined as an IP pair. The first device 10 and the second device 20 use the IP pair provided by the counterpart device or the IP pair provided by itself, according to their respective roles, as determined by exchanging information for determining the roles.

That is, if main communication is connected using OOB for Wi-Fi Peer to Peer (P2P), the first device 10 and the second device 20 transmit and receive GO intent values, which are information for determining their roles, and pairs of IP addresses proposed through OOB messages. Herein, the GO intent value may have the same meaning as group information.

For example, in FIG. 1, the IP pair proposed by the first device 10 indicates that an IP address of the first device 10 is 192.168.1.1 and an IP address of the second device 20 is 192.168.1.2, and the IP pair proposed by the second device 20 indicates that the IP address of the first device 10 is 192.168.10.1 and the IP address of the second device 20 is 192.168.10.2.

In step 107, the role of the first device 10 is determined as a P2P GO and the role of the second device 20 is determined as a P2P client after exchanging of the OOB messages including the IP pairs. Accordingly, the IP pair proposed by the first device 10 is used as the IP addresses of the two devices, and the IP pair proposed by the second device 20 is ignored in step 109. That is, the IP address of the first device 10 is determined as 192.168.1.1 and the IP address of the second device 20 is determined as 192.168.1.2. Using the determined IP addresses, the first device 10 and the second device 20 communicate with each other in step 111.

However, if the role of the first device 10 is determined as the P2P client and the role of the second device 20 is determined as the P2P GO, then the IP pair proposed by the second device 20 is used. That is, the IP address of the first device 10 would be determined as 192.168.10.1 and the IP address of the second device 20 would be determined as 192.168.10.2.

In role determination, the GO intent values of a first device and a second device are compared with each other, and the device having a larger GO intent value is determined to operate as a GO device. If the GO intent values of the two devices are equal to each other, then the device to first send an Association Request message has a higher priority, and thus, operates as a GO device. By performing existing P2P GO negotiation, the roles of the devices may be determined.

Attribute formats of IP address setup and an Address Resolution Protocol (ARP) are shown in Table 1.

TABLE 1

| Attribute | Field | Size (Bytes) | Description |
|---|---|---|---|
| P2P IP Allocation | Attribute ID | 1 | Attribute ID |
| | Length | 2 | Length |
| | P2P Device Address | 6 | Terminal MAC Address |
| | P2P Group Owner IP Address | 4 | GO IP Address Propose (A Handover Request message includes an IP address of the first device, and a Handover Select message includes an IP address of the second device) |
| | P2P Client IP Address | 4 | GC IP Address Propose (A Handover Request message includes an IP address of the second device, and a Handover Select message includes an IP address of the first device) |

The attribute formats of IP address setup and the ARP define information associated with IP addresses included in a Handover Request message and a Handover Select message according to whether the role of the device is a GO device or a client device, as shown in Table 1.

If the first device is a GO device, "P2P GO IP Address" and "P2P Client IP Address" fields proposed by the first device in a Handover Request message are utilized, and "P2P GO IP Address and P2P Client IP Address" fields proposed by the second device in a Handover Select message are discarded.

Figure 2:
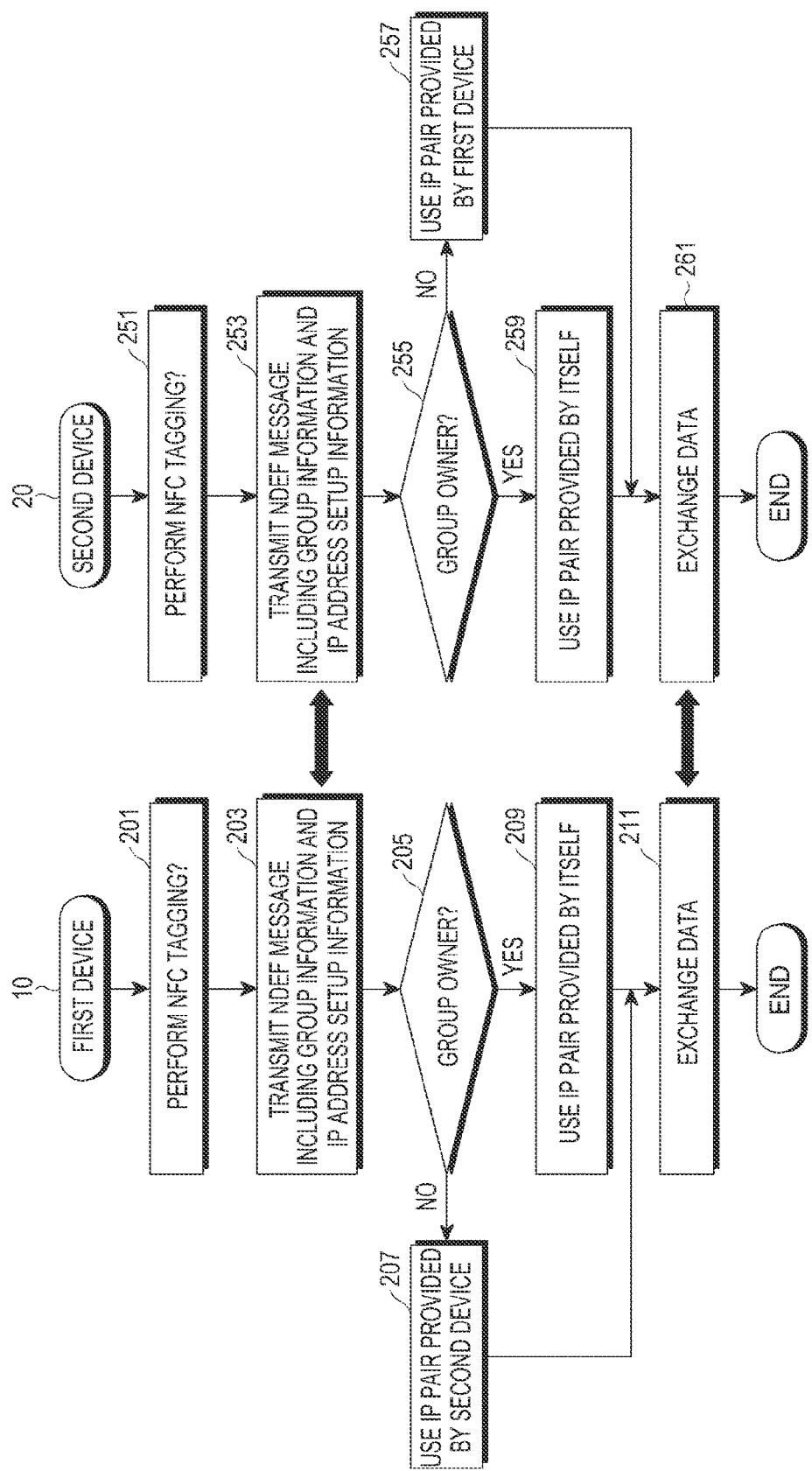
FIG. 2 is a flowchart illustrating a method for setting up an IP address through NFC Data Exchange Format (NDEF) message exchange in a wireless communication system according to an embodiment of the present invention.

FIG. 2 is a flowchart illustrating a method for setting up an IP address in an NFC Data Exchange Format (NDEF) scheme for a high-speed link setup in a wireless communication system according to an embodiment of the present invention.

Referring to FIG. 2, a first device 10 and a second device 20 perform NFC tagging in steps 201 and 251. Thereafter, the first device 10 and the second device 20 exchange NDEF messages in steps 203 and 253. Each NDEF message includes an IP pair and role determination information. In steps 205 and 255, the first device 10 and the second device 20 determine their roles based on the exchanged information.

For example, if the first device 10 is not a P2P GO device in step 205, i.e., the first device 10 is a P2P client device, the first device 10 uses the IP pair provided by the second device 20 in step 207 and exchanges data with the second device 20 in step 211. However, if the first device 10 is a P2P GO device in step 205, the first device 10 uses the IP pair provided by the first device 10 in step 209 and exchanges data with the second device 20 in step 211.

Similarly, the second device 20 exchanges data with the first device 10 in step 261, using an IP pair in steps 257 and 259, according to its determined role in step 255.

Figure 3:
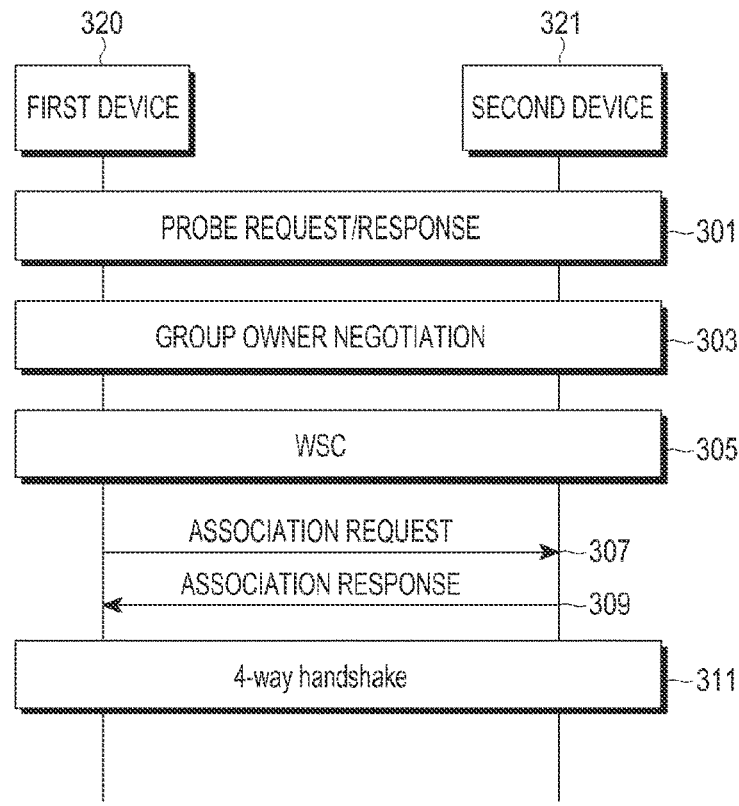
FIG. 3 is a signal flow diagram illustrating a method of allocating an IP address according to an embodiment of the present invention.

FIG. 3 is a signal flow diagram illustrating a method for allocating an IP address according to an embodiment of the present invention.

Referring to FIG. 3, in a Probe Request/Response step 301, a first device 320 and a second device 321 discover each other. In a GO negotiation step 303, the first device 320 and the second device 321 perform a process to determine their respective roles. In a Wi-Fi Simple Configuration (WSC) step 305, the first device 320 and the second device 321 perform a process to request and respond to their association.

In step 307, the first device 320 transmits an Association Request Message to the second device 321, and in step 309, the second device 321 transmits an Association Response message to the first device 320. In step 311, the first device 320 and the second device 321 perform a 4-way handshake.

Each of steps 301 to 311 complies with the Wi-Fi Direct standard.

As illustrated in FIG. 3, an IP address is allocated to each device in an Association Request and Association Response message exchange procedure corresponding to Wi-Fi Direct.

The Association Request message is sent from a client device to a GO device, as an association request to the GO device through a GO negotiation procedure. The Association Request message includes a P2P Information Element (IE), which includes items newly proposed in accordance with an embodiment of the present invention.

The Association Response message is a message sent to the client device from the GO device, in response to the Association Request message through the GO negotiation procedure. The association response message includes a P2P IE, which includes items newly proposed in accordance with an embodiment of the present invention.

The client device is allocated an IP address through an Association Response message.

For example, the client device inserts items, such as "Group Owner Address", "Client Address", "Subnet Mask", and "Router Address", into a P2P IE included in the Association Request message transmitted to the GO device.

The "GO Address" item includes an IP address of the GO device with which the client desires association. The "Client Address" item includes an IP address allocated to the client device by the GO device. The "Subnet Mask" item includes information for subnet identification to be used by the GO device and the client device. The "Router Address" item includes a gateway address.

The client device may manage the "Group Owner Address" item, the "Client Address" item, the "Subnet Mask" item, and the "Router Address" item as a higher-layer item called "P2P IP Allocation" for management of information items of the P2P IE. If the client device uses the "P2P IP Allocation" item, the Association Request message may use the "P2P IP Allocation" item, without lower-layer items.

The GO device determines whether the Association Request message received from the client device includes the "Group Owner Address" item, the "Client Address" item, the "Subnet Mask" item, and the "Router Address" item or includes the P2P IP allocation item, and if so, the GO device records values in the respective items to transmit an Association Response message including IP address information to the client device.

However, if a value of each item is null in the Association Request message received by the GO device or the client device has not inserted the item into the P2P IE, then the GO device may allocate an IP address through a general DHCP procedure or may not allocate an IP address to the client device. If the GO device receives the Association Request message that does not include the items, the client device has no support for being allocated an IP address in accordance with an embodiment of the present invention, and thus, the client device is allocated an IP address through the general DHCP procedure.

Like the Association Request message, the Association Response message may also manage the "Group Owner Address" item, the "Client Address" item, the "Subnet Mask" item, and the "Router Address" item as a higher-layer item, i.e., a "P2P IP Allocation" item.

In a modification of FIG. 3, the GO device and the client device may determine whether an IP address is set prior to the WSC step 305. In this case, without inserting the "Group Owner Address" item, the "Client Address" item, the "Subnet Mask" item, and the "Router Address" item into the Association Request message, IP address allocation may be determined in advance, for example, Probe Request/Response, GO negotiation, or WSC. That is, prior to an Association Request and a Response message exchange, the GO device may recognize whether or not the client device may be allocated with an IP address. Thus, if the client device can support being allocated an IP address, the GO device may directly include an allocated IP address in the Association Response message in step 309, even if the client device transmits an Association Request message having null values in the "Group Owner Address" item, the "Client Address" item, the "Subnet Mask" item, and the "Router Address" item in step 307. If the client device cannot support being allocated an IP address, the IP address is allocated through the general DHCP procedure.

Figure 4:
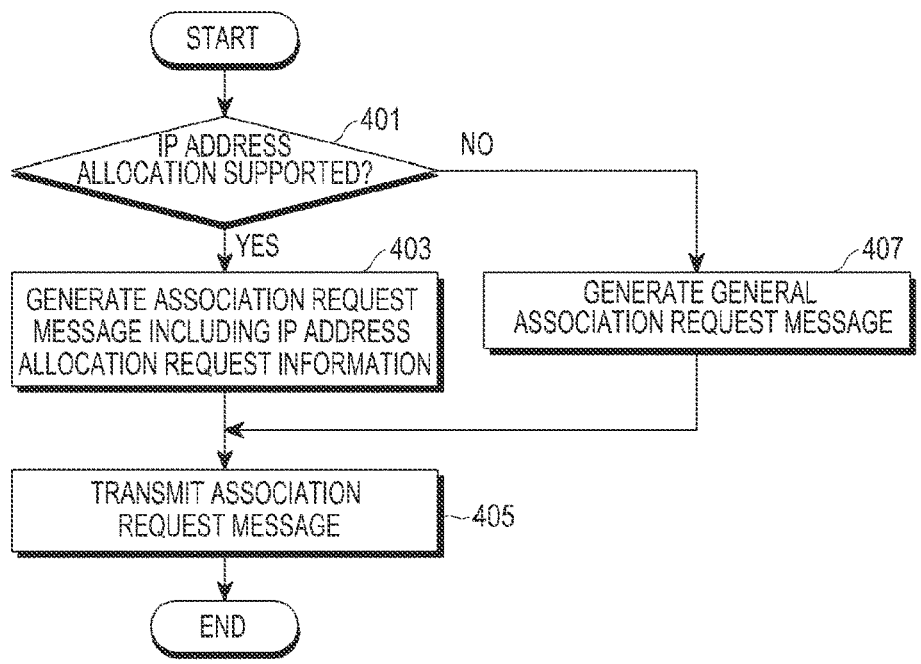
FIG. 4 is a flowchart illustrating a method of requesting an IP address by a client device according to an embodiment of the present invention.

FIG. 4 is a flowchart illustrating a method for transmitting an Association Request message by a client device according to an embodiment of the present invention.

Referring to FIG. 4, the client device determines whether it can support being allocated an IP address in step 401. If the client device has support for being allocated an IP address, the client device configures a P2P IE indicating it is to be allocated with an IP address, and generates an Association Request message including the P2P IE in step 403. The configuration of the P2P IE has already been described above in relation to FIG. 3, and thus, will not be described in detail again. In step 405, the client device transmits the generated Association Request message to the GO device.

However, if the client device cannot support being allocated an IP address in step 401, the client device generates a general Association Request message in step 407 and transmits the general Association Request message to the GO device in step 405.

Figure 5:
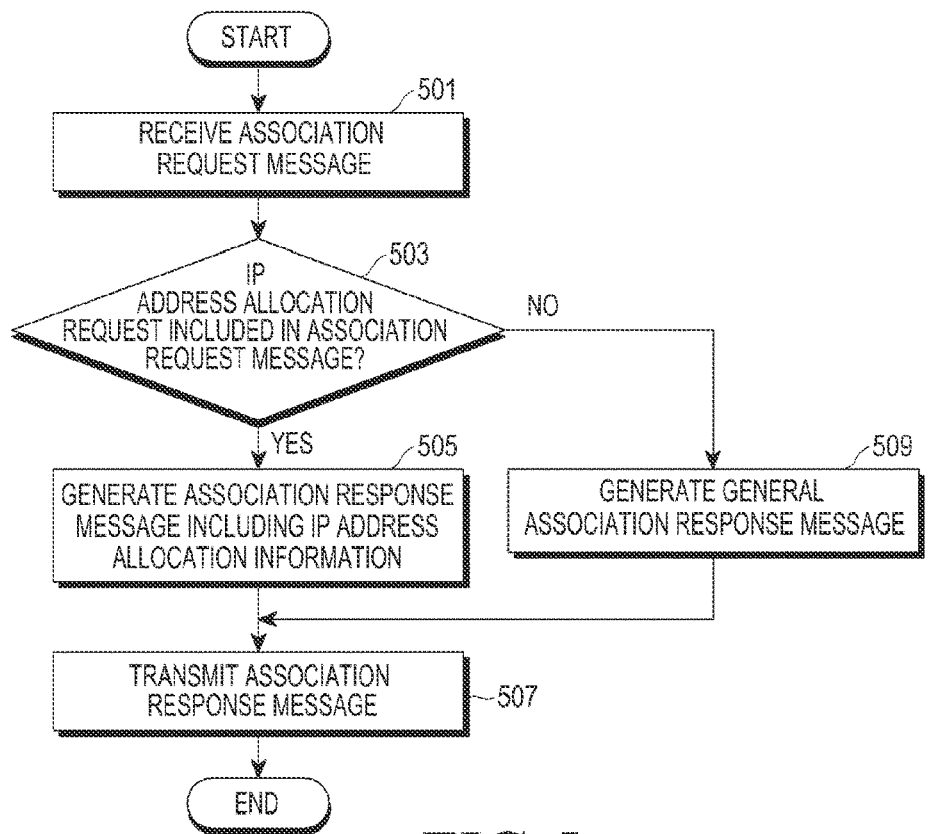
FIG. 5 is a flowchart illustrating a method of transmitting an association response message by a GO device according to an embodiment of the present invention.

FIG. 5 is a flowchart illustrating a method for transmitting an Association Response message by a GO device according to an embodiment of the present invention.

Referring to FIG. 5, the GO device receives an Association Request message from the client device in step 501. In step 503, the GO device analyzes the received Association Request message, i.e., the "P2P IP Allocation" item or the "Group Owner Address" item, the "Client Address" item, the "Subnet Mask" item, and the "Router Address" item in a P2P IE included in the received Association Request message, to determine if the for the received Association Request message includes IP address allocation request. If IP address allocation-related items are included in the P2P IE, the GO device generates an Association Response message including input values for the items in step 505. In step 507, the GO device transmits the generated Association Response message to the client device.

However, if there is no IP address allocation-related item, as a result of the analysis of the Association Request message in step 503, the GO device generates a general association response message in step 509 and transmits the generated association response message to the client device in step 507.

As illustrated in FIG. 5, an IP address is allocated according to a DHCP procedure in an L3 layer of the Wi-Fi Direct standard is performed in an L2 layer, thus providing a method in which an IP address is quickly allocated between devices.

Figure 6:
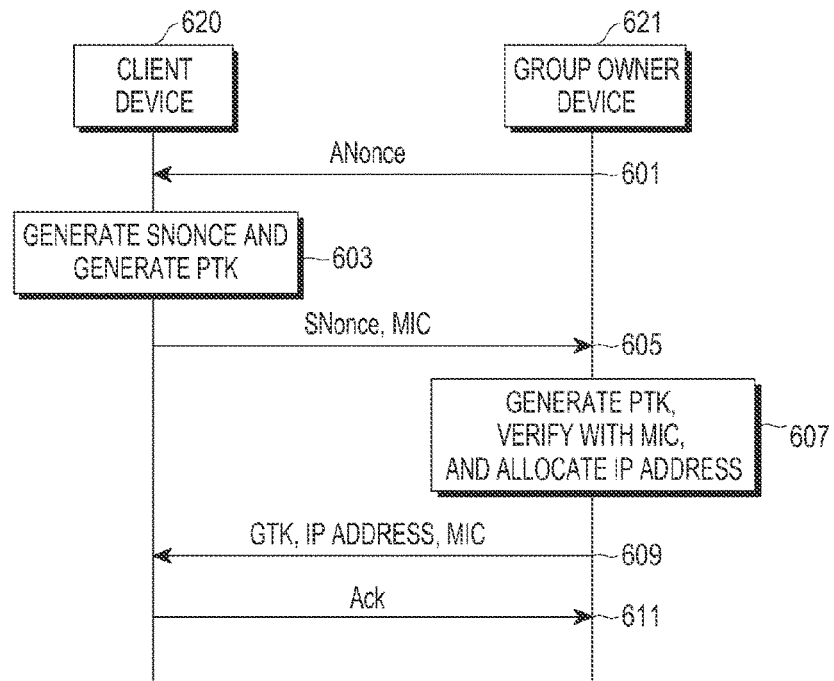
FIG. 6 is a signal flow diagram illustrating a method for allocating an IP address in a 4-way handshake step according to an embodiment of the present invention.

FIG. 6 is a signal flow diagram illustrating a method for allocating an IP address in a 4-way handshake step according to an embodiment of the present invention.

Referring to FIG. 6, a GO device (or an authenticator) 621 transmits an EAPOL-Key message including an ANonce to the client device (or a supplicant) 620 in step 601. The ANonce is a random number the GO device 621 generates in a 4-way handshake step.

In step 603, the client device 620 generates an SNonce and then generates a Pairwise Temporal Key (PTK) using the received ANonce and a Pairwise Master Key (PMK). The PMK is a key that the user inputs or that is generated/set through a WSC step. The SNonce is a random number the client device generates in the 4-way handshake step.

The client device 620 generates an EAPOL-Key message including an SNonce, a Robust Security Network (RSN) IE (e.g., a P2P IE included in a Re-Association Request frame or an Association Request frame), and a Message Integrity Code (MIC), and transmits the generated EAPOL-Key message to the GO device 621 in step 605.

The GO device 621 generates the PTK using the SNonce, the ANonce, and the PMK, performs verification using the MIC, and allocates an IP address to the client device 620 in step 607. Verification using the MIC determines whether key values are identical to each other.

In step 609, the GO device 621 transmits, to the client device 620, an EAPOL-Key message including ANonce, an RSN IE (an IE included in a Beacon or Probe Response message), an MIC, a Group Terminal Key (GTK), and the IP address allocated to the client device 620 in step 609.

In step 611, the client device 620 receives the allocated PTK, GTK, and IP address from the GO device 621, and then transmits an EAPOL-Key message for confirmation (or ACKnowledgement (ACK)) to the GO device 621 in step 611.

The IP address allocated by the GO device to the client device in step 609 is included in a "Key Data" field of the EAPOL-Key message, and the "Key Data" field complies with a format as will be described below with reference to FIG. 8.

FIG. 7 illustrates a format of an EAPOL Key message exchanged in a 4-way handshake step according to an embodiment of the present invention.

Referring to FIG. 7, in the 4-way handshake step, a client device transmits an item for requesting an IP address through the "Key Data" field having a format of the EAPOL-Key message to a GO device. The GO device transmits the IP address of the client device and the IP address of the GO device through the "Key Data" field having the format of the EAPOL-Key message.

FIG. 8 illustrates a basic format for defining Key Data Encapsulation (KDE) per organization or company in the 4-way handshake step according to an embodiment of the present invention.

Referring to FIG. 8, an Organization Unique Identifier (OUI) may be, for example, 50 6F 9A for Wi-Fi Alliance, as defined by the IEEE Standard. A "Data Type" field has a value that identifies KDE for inserting key data exchanged in the 4-way handshake step, and is managed by an OUI organization. For example, "3" is set to distinguish IP Address Allocation KDE and IP Address Request KDE, and this value may be changed into another value or another value may be set. A "Data" field may include, for example, "IP Address Allocation KDE", as illustrated in FIG. 9.

FIG. 9 illustrates an IP Address Allocation KDE, as an example of "Data", according to an embodiment of the present invention.

Referring to FIG. 9, IP Address Allocation KDE is included in the "Data" field as illustrated in FIG. 8, and includes a "Client IP Address" item, a "Group Owner Address" item, and a "Subnet Mask" field. For example, as illustrated in 609 step of FIG. 6, the GO device may record a value for each field provided in IP Address Allocation KDE and transmit the IP address of the client device and the IP address of the GO device to the client device.

Figures 10, 11, 12:
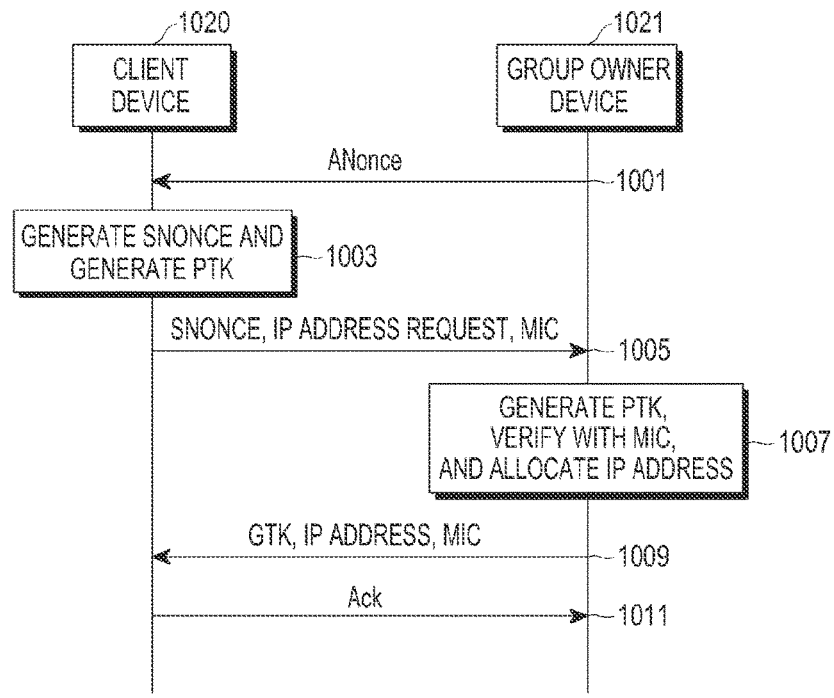
FIG. 10 is a signal flow diagram illustrating a method for allocating an IP address in a 4-way handshake step according to an embodiment of the present invention.
FIG. 11 illustrates an IP Address Request KDE inserted into a "Data" field according to an embodiment of the present invention.
FIG. 12 illustrates an IP Address Allocation KDE inserted into a "Data" field according to an embodiment of the present invention.

FIG. 10 is a signal flow diagram illustrating a method for allocating an IP address in a 4-way handshake step according to an embodiment of the present invention. Specifically, in FIG. 10, after a client device (or supplicant) 1020 sends an IP address request to a GO device (or authenticator) 1021, the client device 1020 is allocated an IP address from the GO device 1021.

Referring to FIG. 10, the GO device 1021 transmits an EAPOL-Key message including an ANonce to the client device 1020 in step 1001.

In step 1003, the client device 1020 generates an SNonce and then generates a PTK using the received ANonce. The PMK is a key that is input by the user or generated/set by WSC.

In step 1005, the client device 1020 generates an EAPOL-Key message including information for requesting an SNonce, an RSN IE, an MIC, and an IP address, and transmits the generated EAPOL-Key message to the GO device 1021.

In step 1007, the GO device 1021 generates a PTK using the SNonce included in the received EAPOL-Key message, the ANonce used in step 1001, and the PMK, performs verification through the MIC, and allocates an IP address to be used by the client device 1020.

In step 1009, the GO device 1021 transmits, to the client device 1020, an EAPOL-Key message including an ANonce, an RSN IE, an MIC, a GTK, and the IP address allocated to the client device 1020.

In step 1011, the client device 1020 receives the PTK and the GTK, sets the IP address allocated by the GO device 1021, and then transmits an EAPOL-Key message for confirmation to the GO device 1021.

The IP address request information transmitted from the client device 1020 to the GO device 1021 in step 1005 is included in the "Key Data" field of the EAPOL-Key message as illustrated in FIG. 7, and the "Key Data" field complies with the format as illustrated in FIG. 8. Thus, in FIG. 8, "OUI" may be, for example, 50 6F 9A, for Wi-Fi Alliance, and may be an IP Address Request KDE of "Data Type".

FIG. 11 illustrates an IP Address Request KDE, as an example of "Data", according to an embodiment of the present invention.

Referring to FIG. 11, a "Requested IP Address" field is used for a client device to send an IP address request to a GO device, and the client device may also request an IP address the client device used before. If a value for the field is "1", IP allocation from the GO device is requested.

An "IP Address Lease Time" field indicates a time for which the client device will use the IP address. If the value for this field is "0", the IP address is to be used for a time designated by the GO device; and if the value of this field is a maximum value, an infinite lease of the IP address is requested.

The IP address allocated to the P2P client device in step 1009 of FIG. 10 is included in the "Key Data" field as illustrated in FIG. 7 and complies with the format as illustrated in FIG. 8. "OUI" may be, for example, 50 6F 9A, for Wi-Fi Alliance, and an example of "Data Type" may be an IP Address Allocation KDE.

FIG. 12 illustrates an IP Address Allocation KDE inserted into a "Data" field according to an embodiment of the present invention.

Referring to FIG. 12, an IP address allocated to the client device by the GO device is included in a "Client IP Address" field, and the IP address may be an IP address the client device requested, but the GO device may allocate another address depending on circumstances. A "Subnet Mask" field includes information for subnet identification, and a "Group Owner Address" field includes an IP address of a GO device. An "IP Address Lease Time" field indicates a time for which an IP address is valid, and if a value for this field is a maximum value, then it indicates an infinite lease time.

As is apparent from the forgoing description, if there an IP address cannot be set in a wireless communication system, role decision and IP address allocation are simultaneously performed, providing high-speed IP address setup.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

While the present invention has been particularly illustrated and described with reference to certain embodiments thereof, various modifications or changes can be made without departing from the scope of the present invention. Therefore, the scope of the present invention is not limited to the above-described embodiments, but should be defined by the scope of the following claims and any equivalents thereof.

What is claimed is:

1. A method for setting up, by a first device, an internet protocol (IP) address between devices in a wireless communication system, the method comprising:
    transmitting, to a second device, a first IP address pair proposed by the first device, the first IP address pair including a first IP address for the first device and a first IP address for the second device;
    receiving, from the second device, a second IP address pair proposed by the second device, the second IP address pair including a second IP address for the first device and a second IP address for the second device;
    determining one of the first device and the second device as a group owner (GO) device;
    determining the one of the first device and the second device not determined as the GO device as a client device; and
    determining an IP address to be allocated for the first device and an IP address to be allocated for the second device using the IP address pair proposed by the one of the first device and the second device determined as the GO device.

2. The method of claim 1, further comprising performing near field communication (NFC) tagging to establish an initial association between the first device and the second device.

3. The method of claim 1, further comprising discarding the IP address pair proposed by the client device.

4. The method of claim 1, wherein the first IP address pair proposed by the first device is transmitted through a handover request message and the second IP address pair proposed by the second device is transmitted through a handover select message.

5. The method of claim 4, wherein the handover request message and the handover select message further comprise information for determining the first device and the second device as the client device or the GO device.

6. A method of receiving, by a client device, an internet protocol (IP) address for communication between the client device and a group owner (GO) device, the method comprising:
    transmitting, to the GO device, an association request message;
    receiving, from the GO device, an association response message, in response to the association request message;
    receiving, from the GO device, a first extensible authentication protocol over local area network (EAPOL) key frame including a first random number, after receiving the association request message;
    transmitting, to the GO device, a second EAPOL key frame including a second random number and a message integrity check (MIC) key, after receiving the first EAPOL key frame, wherein the second random number is generated by the client device;
    receiving, from the GO device, a third EAPOL key frame including an IP address of the client device allocated by the GO device, an IP address of the GO device, an MIC, and a group temporal key (GTK), after transmitting the second EAPOL key frame; and
    transmitting, to the GO device, a fourth EAPOL key frame for confirmation, after receiving the third EAPOL key frame.

7. The method of claim 6, wherein receiving the third EAPOL key frame comprises receiving the IP address of the client device, the IP address of the GO device, and a subnet value used by the GO device through an IP allocation IP allocation key data encryption (KDE) included in the third EAPOL key frame.

8. The method of claim 7, wherein the second EAPOL key frame includes an IP address request KDE for an IP address request.

9. A method for allocating, by a group owner (GO), an internet protocol (IP) address to a client device for communication between the client device and the GO device, the method comprising:
    receiving, from the client device, an association request message;
    transmitting, to the client device, an association response message, in response to the association request message;
    transmitting, to the client device, a first extensible authentication protocol over local area network (EAPOL) key frame including a first random number, after receiving the association request message;
    receiving, from the client device, a second EAPOL key frame including a second random number and a message integrity check (MIC) key, after receiving the first EAPOL key frame, wherein the second random number is generated by the client device;
    transmitting, to the client device, a third EAPOL key frame including an IP address of the client device allocated by the GO device, an IP address of the GO device, an MIC, and a group temporal key (GTK), after receiving the second EAPOL key frame; and
    receiving, from the client device, a fourth EAPOL key frame for confirmation, after transmitting the third EAPOL key frame.

10. The method of claim 9, wherein transmitting the third EAPOL key frame comprises transmitting the IP address of the client device, the IP address of the GO device, and a subnet value used by the GO device through an IP allocation key data encryption (KDE) included in the third EAPOL key frame.

11. The method of claim 10, wherein the second EAPOL key frame includes an IP address request KDE for an IP address request.

12. A first device for setting up an internet protocol (IP) address between devices in a wireless communication system, the device comprising:

a transceiver configured to transmit or receive data; and
a controller configured to control to
- transmit, to a second device, an first IP address pair proposed by the first device, the first IP address pair including a first IP address for the first device and a first IP address for the second device,
- receive, from the second device, a second IP address pair proposed by the second device, the second IP address pair including a second IP address for the first device and a second IP address for the second device,
- determine one of the first device and the second device as a group owner (GO) device,
- determine the one of the first device and the second device not determined as the GO device as a client device, and
- determine an IP address to be allocated for the first device and an IP address to be allocated for the second device using the IP address pair proposed by the one of the first device and the second device determined as the GO device.

13. The device of claim 12, wherein the controller is further configured to perform near field communication (NFC) tagging to establish an initial association between the first device and the second device.

14. The device of claim 12, wherein the controller is further configured to control to discard the IP address proposed by the client device.

15. The device of claim 12, wherein the first IP address pair proposed by the first device is transmitted through a handover request message and the second IP address pair proposed by the second device is received through a handover select message.

16. The device of claim 15, wherein the handover request message and the handover select message further comprise information for determining the first device and the second device as the client device or the GO device.

17. A client device for receiving an internet protocol (IP) address for communication between the client device and a group owner (GO) device, the client device comprising:
a transceiver configured to transmit or receive data; and
a controller configured to control to:
- transmit an association request message to the GO device,
- receive, from the GO device, an association response message, in response to the association request message,
- receive, from the GO device, a first extensible authentication protocol over local area network (EAPOL) key frame including a first random number, after receiving the association request message,
- transmit, to the GO device, a second EAPOL key frame including a second random number and a message integrity check (MIC) key, after receiving the first EAPOL key frame, wherein the second random number is generated by the client device,
- receive, from the GO device, a third EAPOL key frame including an IP address of the client device allocated by the GO device, an IP address of the GO device, an MIC, and a group temporal key (GTK), after transmitting the second EAPOL key frame, and
- transmit, to the GO device, a fourth EAPOL key frame for confirmation, after receiving the third EAPOL key frame.

18. The client device of claim 17, wherein the third EAPOL key frame comprises an IP allocation key data encryption (KDE) for the IP address of the client device, the IP address of the GO device, and a subnet value used by the GO device.

19. The client device of claim 18, wherein the second EAPOL key frame includes an IP address request KDE for an IP address request.

20. A group owner (GO) device for allocating an internet protocol (IP) address to a client device for communication between the client device and the GO device, the GO device comprising:
a transceiver configured to transmit or receive data; and
a controller configured to control to:
- receive an association request message from the client device,
- transmit an association response message to the client device, in response to the association request message,
- transmit, to the client device, a first extensible authentication protocol over local area network (EAPOL) key frame including a first random number, after receiving the association request message,
- receive, from the client device, a second EAPOL key frame including a second random number and a message integrity check (MIC) key, after transmitting the first EAPOL key frame, wherein the second random number is generated by the client device,
- transmit, to the client device, a third EAPOL key frame including an IP address of the client device allocated by the GO device, an IP address of the GO device, an MIC, and a group temporal key (GTK), after receiving the second EAPOL key frame, and
- receive, from the client device, a fourth EAPOL key frame for confirmation, after transmitting the third EAPOL key frame.

21. The GO device of claim 20, wherein the third EAPOL key frame comprises an IP allocation key data encryption (KDE) for the IP address of the client device, the IP address of the GO device, and a subnet value used by the GO device.

22. The GO device of claim 21, wherein the second EAPOL key frame includes an IP address request KDE for an IP address request.

\* \* \* \* \*